UNITED STATES PATENT OFFICE.

CONRAD SCHRAUBE AND ERNST LAUDIEN, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

POLYCHLORAMIDIN AND PROCESS OF MAKING SAME.

No. 892,900.

Specification of Letters Patent.

Patented July 7, 1908.

Application filed June 12, 1906. Serial No. 321,347. (Specimens.)

*To all whom it may concern:*

Be it known that we, CONRAD SCHRAUBE and ERNST LAUDIEN, doctors of philosophy and chemists, subjects of the King of Prussia, residing at Ludwigshafen-on-the-Rhine, in the Kingdom of Bavaria, German Empire, have invented new and useful Improvements in Polychloramidins and Processes of Making Same, of which the following is a specification.

Our invention relates to the manufacture and production of polychloramidins from as-trichlordiamidobenzene, that is to say, amidins possessing the constitution represented by the following formula

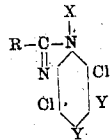

(where R indicates hydrogen, or alphyl, or aryl, X indicates hydrogen, or alphyl, and where one Y indicates chlorin while the other Y indicates hydrogen, or chlorin). We prepare these new compounds by reducing the ortho-nitroacylamido derivatives (either alphylated or unalphylated) of as-trichlorbenzene, or of v-tetrachlorbenzene, when either the ring formation takes place during the reaction, or the diamido compound is obtained, in which case it is necessary to heat this latter, either alone, or in the presence of a dehydrating agent. Generally a mixture of the amidin and the diamido compound is obtained, and it is then unnecessary to separate the two compounds, for, by merely heating the mixture, either alone, or in the presence of a dehydrating agent, the amidin alone is obtained.

The general reactions which take place when carrying out this invention can be illustrated by the following equations

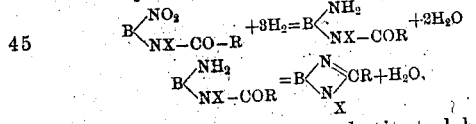

where B represents the substituted benzene radical.

We have also found that the alphyl derivatives of the unalphylated tri- and tetra-chloramidins can be obtained by treating an alkali salt of such tri- or tetra-chloramidins with an alphylating agent such for instance as methyl chlorid. The alphyl trichloramidins, obtained in this way, are isomeric and not identical with those obtained by reducing the corresponding ortho-nitro-alphyl-acyl-amido derivatives of trichlorbenzene.

The abbreviations "as" and "v" are used to denote the words "asymmetrical" and "vicinal" in the manner well known to and used by chemists.

Our new compounds will make nitrocellulose swell and can therefore be substituted for camphor in the manufacture of substances resembling celluloid from nitrocellulose.

The following examples will serve to further illustrate the nature of our invention and how it can be carried into practical effect, but our invention is not confined to these examples. The parts are by weight.

Example 1: Heat together, in a reflux apparatus, while stirring, one hundred (100) parts of 1-acetylamido-2-nitro-3.4.6-trichlorbenzene (obtained by the nitration of as-acettrichloranilid), four hundred (400) parts of iron, fifteen (15) parts of glacial acetic acid, six hundred (600) parts of water, and one thousand (1,000) parts of xylene, until a test portion of the xylene solution, when heated with alcohol and caustic soda, does not show any yellow coloration. When the reduction is complete extract the reaction product by means of hot xylene, whereupon crystals are obtained from which the ethenyl-trichloramidin, melting at a temperature of two hundred and eighty-five (285) degrees centigrade, can be obtained by fractional crystallization from alcohol, the impurities being less soluble in this solvent than is the amidin.

Example 2: A better yield of ethenyl-trichloramidin can be obtained as follows. Heat together, in a reflux apparatus, while stirring, one hundred (100) parts of 1-acetyl-amido-2-nitro-3.4.6.-trichlorbenzene (obtained by the nitration of as-acettrichloranilid), four hundred (400) parts of iron, fifteen (15) parts of glacial acetic acid, six hundred (600) parts of water, and one thousand (1,000) parts of xylene, until a test portion of the xylene solution, when heated with alcohol and caustic soda, does not show any yellow coloration. When the reduction is complete, extract the reaction product by means of hot xylene, and heat the crystals obtained at a temperature of from two hundred (200), to two hundred and ninety (290), degrees centigrade.

Example 3: Heat together, in a reflux apparatus, while stirring, one hundred (100) parts of 1-acetylamido-2-nitro-3.4.6-trichlorbenzene (obtained by the nitration of asacettrichloranilid), four hundred (400) parts of iron, fifteen (15) parts of glacial acetic acid, six hundred (600) parts of water, and one thousand (1,000) parts of xylene, until a test portion of the xylene solution, when heated with alcohol and caustic soda, does not show any yellow coloration. When the reduction is complete, extract the reaction product by means of hot xylene, and heat the crystals obtained with about three (3) times their weight of glacial acetic acid for twenty (20) hours on the water-bath.

Example 4: Heat together, in a reflux apparatus, while stirring, one hundred (100) parts of 1-formylamido-2-nitro-3.4.6-trichlorbenzene (obtained by nitrating asformyltrichloranilid), four hundred (400) parts of iron, thirty (30) parts of thirty (30) per cent. hydrochloric acid, six hundred (600) parts of water, and one thousand (1000) parts of xylene. When the reduction is complete add caustic soda solution until the whole is alkaline and then extract the reaction product by means of hot xylene from which, upon cooling, methenyltrichloramidin separates out. This can be purified by sublimation and melts at a temperature of from three hundred and three (303), to three hundred and four (304), degrees centigrade. The corresponding formyltrichlororthophenylenediamin upon being melted is converted into the amidin.

Example 5: Reduce one hundred (100) parts of 1-methylformylamido-2-nitro-3.4.6-trichlorbenzene as described in the foregoing example 1. The xylene solution, on cooling, yields crystals of methylmethenyltrichloramidin (melting point from one hundred and fifty-nine (159), to one hundred and sixty (160), degrees centigrade), mixed with the corresponding diamido compound. These two compounds can be separated by fractional crystallization from xylene, or the whole can be distilled in vacuo (boiling point two hundred and thirty (230) degrees centigrade at a pressure of fourteen (14) millimeters), whereupon the homogeneous amidin is obtained.

Example 6: Reduce one hundred (100) parts of 1-ethylacetylamido-2-nitro-3.4.6-trichlorbenzene as described in the foregoing example 1, and heat the mixture of diamin and amidin, which separates from the xylene solution, with double the quantity of glacial acetic acid on the water-bath for twenty (20) hours. The crystals, which separate out at the end of this time, melt at a temperature of from ninety-eight (98), to ninety-nine (99), degrees centigrade and consist of the acetate of ethylethenyltrichloramidin which upon being heated at a temperature of one hundred (100) degrees centigrade is converted into the amidin base melting at a temperature of from one hundred and sixteen (116), to one hundred and seventeen (117), degrees centigrade. This compound on account of its solubility appears to us to be most suitable for the manufacture of celluloid-like bodies.

Example 7: Reduce one hundred (100) parts of 1-acetylamido-2-nitro-3.4.5.6-tetrachlorbenzene in the manner described in example 1. Crystals of the corresponding diamido compound are obtained from the xylene solution and, upon being heated at a temperature of three hundred (300) degrees centigrade and upon sublimation, are converted into ethenyltetrachloramidin.

Example 8: Reduce 1-ethylacetylamido-2-nitro-3.4.5.6-tetrachlorbenzene in the manner described in example 1 and heat the obtained diamido compound for several hours in glacial acetic acid solution whereupon ethylethenyltetrachloramidin, melting at a temperature of one hundred and forty-nine (149) degrees centigrade, is obtained. By treating the benzyl compound of 1-acetylamido-2-nitro-3.4.5.6-tetrachlorbenzene in a similar manner, the corresponding diamido compound and benzylethenyltetrachloramidin, melting at a temperature of from one hundred and seventy-six (176), to one hundred and seventy-seven (177), degrees centigrade, can be obtained.

Example 9: Reduce one hundred (100) parts of 1-benzoylamido-2-nitro-3.4.6-trichlorbenzene in the manner described in the foregoing example 1, and distil in vacuo the diamido compound so obtained, whereupon benzenyltrichloramidin, melting at a temperature of from two hundred and sixty-eight (268), to two hundred and sixty-nine (269), degrees centigrade, is obtained.

Example 10: Dissolve one hundred (100) parts of ethenyltrichloramidin (prepared as described in example 1) in a solution of ten (10) parts of sodium in four hundred (400) parts of wood spirit. Then add sixty-six

(66) parts of methyl iodid and boil the whole in a reflux apparatus for twenty (20) hours, then distil off the wood spirit, treat the residue with water, and recrystallize the product so obtained from benzene, or from dilute alcohol. In this way methylethenyltrichloramidin of the formula given below is obtained:

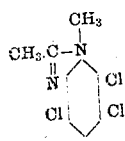

Now what we claim is:

1. The process for the production of polychloramidins by reducing a hereinbefore defined orthonitroacylamido polychlorbenzene.

2. The process for the production of polychloramidins by reducing a hereinbefore defined orthonitroacylamido polychlorbenzene and heating the product so obtained.

3. The process for the production of polychloramidins by reducing a hereinbefore defined orthonitroacylamido polychlorbenzene and heating in the presence of a dehydrating agent the product so obtained.

4. As new articles of manufacture the polychloramidins which can be obtained by reducing a hereinbefore defined orthonitroacylamido polychlorbenzene, which amidins possess the property of being able to make nitrocellulose swell and consist when pure of colorless crystals which are soluble in hot xylene, and which possess a constitution corresponding to the hereinbefore defined formula

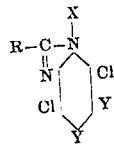

5. As a new article of manufacture ethylethenyltrichloramidin which can be obtained by reducing 1-ethylacetylamido-2-nitro-3.4.6-trichlorbenzene, which amidin possesses the property of being able to make nitrocellulose swell and consists when pure of colorless crystals which melt at a temperature of about one hundred and sixteen degrees centigrade, which are soluble in hot xylene and which possess a constitution corresponding to the formula

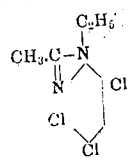

In testimony whereof we have hereunto set our hands in the presence of two subscribing witnesses.

CONRAD SCHRAUBE.
ERNST LAUDIEN.

Witnesses:
ERNEST F. EHRHARDT,
H. W. HARRIS.